(12) United States Patent
Morioka et al.

(10) Patent No.: US 7,734,182 B2
(45) Date of Patent: *Jun. 8, 2010

(54) ILLUMINATOR INCLUDING OPTICAL TRANSMISSION MECHANISM

(75) Inventors: Tatsuya Morioka, Nara (JP); Mototaka Taneya, Nara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/118,372

(22) Filed: May 9, 2008

(65) Prior Publication Data

US 2008/0260392 A1 Oct. 23, 2008

Related U.S. Application Data

(63) Continuation of application No. 10/861,126, filed on Jun. 3, 2004, now Pat. No. 7,389,051.

(30) Foreign Application Priority Data

Jun. 3, 2003 (JP) .............................. 2003-157684

(51) Int. Cl.
H04B 10/00 (2006.01)
(52) U.S. Cl. ..................................... 398/127; 398/118
(58) Field of Classification Search .......... 398/118–131
See application file for complete search history.

(56) References Cited

U.S. PATENT DOCUMENTS

| 5,307,194 | A | 4/1994 | Hatton et al. |
| 5,535,230 | A * | 7/1996 | Abe .......................... 372/50.23 |
| 6,250,774 | B1 | 6/2001 | Begemann et al. |
| 6,542,270 | B2 * | 4/2003 | Perkins et al. .............. 398/140 |
| 7,187,866 | B2 | 3/2007 | Krill et al. |
| 7,389,051 | B2 * | 6/2008 | Morioka et al. ............. 398/127 |
| 2002/0167701 | A1* | 11/2002 | Hirata ........................ 359/172 |
| 2008/0260392 | A1* | 10/2008 | Morioka et al. ............. 398/140 |

FOREIGN PATENT DOCUMENTS

| JP | 2002-190776 | 7/2002 |
| JP | 2002-261334 | 9/2002 |
| JP | 2002-290335 | 10/2002 |
| JP | 2003-318836 | 11/2003 |

OTHER PUBLICATIONS

Morioka, T. et al., U.S. Office Action mailed Mar. 9, 2007, directed to a related U.S. Appl. No. 10/861,126; 7 pages.
Morioka, T. et al., U.S. Office Action mailed Jul. 24, 2007, directed to a related U.S. Appl. No. 10/861,126; 9 pages.

* cited by examiner

*Primary Examiner*—Quan-Zhen Wang
(74) *Attorney, Agent, or Firm*—Morrison & Foerster LLP

(57) ABSTRACT

An illuminator including an optical transmission mechanism includes a transmission-side electric circuit for forming electric signals modulated in response to information, a light source for emitting intensity-modulated light in response to the electric modulated signals, optical wavelength conversion means including fluorescent material for converting part of the intensity-modulated light into illumination light, photoelectric conversion means for receiving another part of the modulated light and converting this part into reproduced electric modulated signals and a receiving-side electric circuit for reproducing the information from the reproduced electric modulated signals.

6 Claims, 10 Drawing Sheets

US 7,734,182 B2

ILLUMINATOR INCLUDING OPTICAL TRANSMISSION MECHANISM

This nonprovisional application is a continuation of application Ser. No. 10/861,126 filed Jun. 3, 2004, based on Japanese Patent Application No. 2003-157684 filed with the Japan Patent Office on Jun. 3, 2003, the entire contents of which are hereby incorporated by reference.

BACKGROUND OF THE INVENTION

1. Field of the Invention

The present invention relates to an illuminator including a light-emitting device and fluorescent materials capable of radiating various color lights by converting wavelength of light emitted from the light-emitting device, and more particularly, it relates to an illuminator also having an optical transmission function of transmitting optical signals through space.

2. Description of the Background Art

Japanese Patent Laying-Open No. 2002-290335 discloses a space optical transmitter as an exemplary illuminator also having a space optical transmission function. This space optical transmitter includes a transmission-side device for energizing LEDs (light-emitting diodes) of red, green and blue serving as illumination light sources while modulating power waveforms supplied to the light sources in response to information and a receiving-side device for demodulating the information from the illumination light through photodetection means for receiving the illumination light from the transmission-side device.

According to such a space optical transmitter, the transmission-side device can be arranged on a ceiling thereby avoiding obstruction in optical transmission, and the facility having both functions of communication and illumination can be simplified by rendering the communication function and the illumination function in common.

The aforementioned space optical transmitter disclosed in Japanese Patent Laying-Open No. 2002-290335 must employ a plurality of LEDs for emitting at least three color lights of red, green and blue as the light sources for light to be transmitted, so as to also have the illumination function.

When wavelengths within the visible band are employed for transmission light in a situation where sunlight is present, the sunlight acts as background noise light against color lights to be transmitted, so that no sufficient S/N (signal-to-noise ratio) can be kept in optical transmission and hence no sufficient transmission rate can be achieved.

Japanese Patent Laying-Open No. 2002-290335 also suggests that the so-called WDM (wavelength division multiplex) communication can be enabled by introducing different signal data into three primary color lights of the space optical transmitter and transmitting the same. However, driving voltages for the respective LEDs for emitting lights of red, green and blue depend on energy band gaps of semiconductor emission layers included in the LEDs. In other words, the driving voltages for driving the LEDs for emitting lights of different colors are remarkably different from each other, so that it is necessary to provide the LEDs with different driving circuits designed to operate with the respective voltages.

SUMMARY OF THE INVENTION

In view of the aforementioned status in the prior art, the present invention aims at providing an illuminator which includes only one light source and an optical communication mechanism with an excellent S/N ratio, and also aims at providing an illuminator which includes an optical communication mechanism including driving circuits which operate at the substantially same voltage so as to drive a plurality of light sources in WDM communication.

According to the present invention, an illuminator including an optical transmission mechanism includes a transmission-side electric circuit for forming electric signals modulated in response to information, a light source for emitting intensity-modulated light in response to the electric modulated signals, optical wavelength conversion means including a fluorescent materials for converting part of the modulated light into illumination light, photoelectric conversion means for receiving and converting another part of the modulated light to reproduced electric modulated signals and a receiving-side electric circuit for reproducing the information from the reproduced electric modulated signals.

Either a semiconductor light-emitting diode or a semiconductor laser can preferably be used as the light source. The intensity-modulated light from the light source preferably has a wavelength in the range of 380 nm to 430 nm.

It is preferable that the illuminator further includes light diffusion means for scattering at least part of the modulated light. The fluorescent materials can preferably be used as the light diffusion means.

It is preferable that the modulation band of the modulated light and the decay time of the emission intensity of the fluorescent material satisfy the relation (modulation band (Hz) of modulated light<1/decay time of emission intensity of fluorescent material (sec.)). The light source can include a plurality of emission sources for emitting lights of different wavelengths capable of exciting the fluorescent materials. A photodetector can be used as the photoelectric conversion means, and an optical film for transmitting only the modulated light can be provided thereon.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
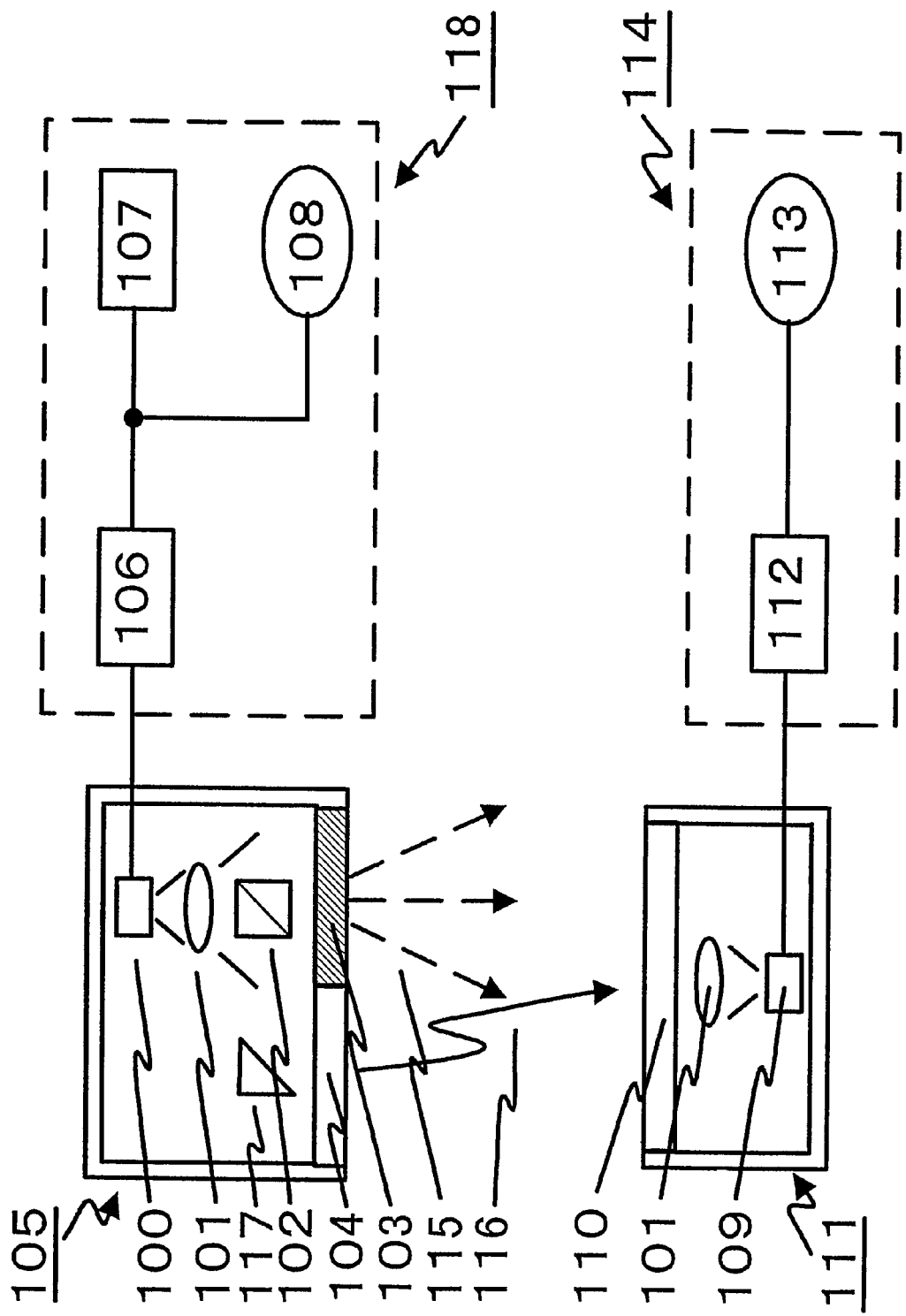
FIG. 1 is a block diagram schematically showing an illuminator including an optical transmission mechanism according to an embodiment of the present invention.
Figure 2:
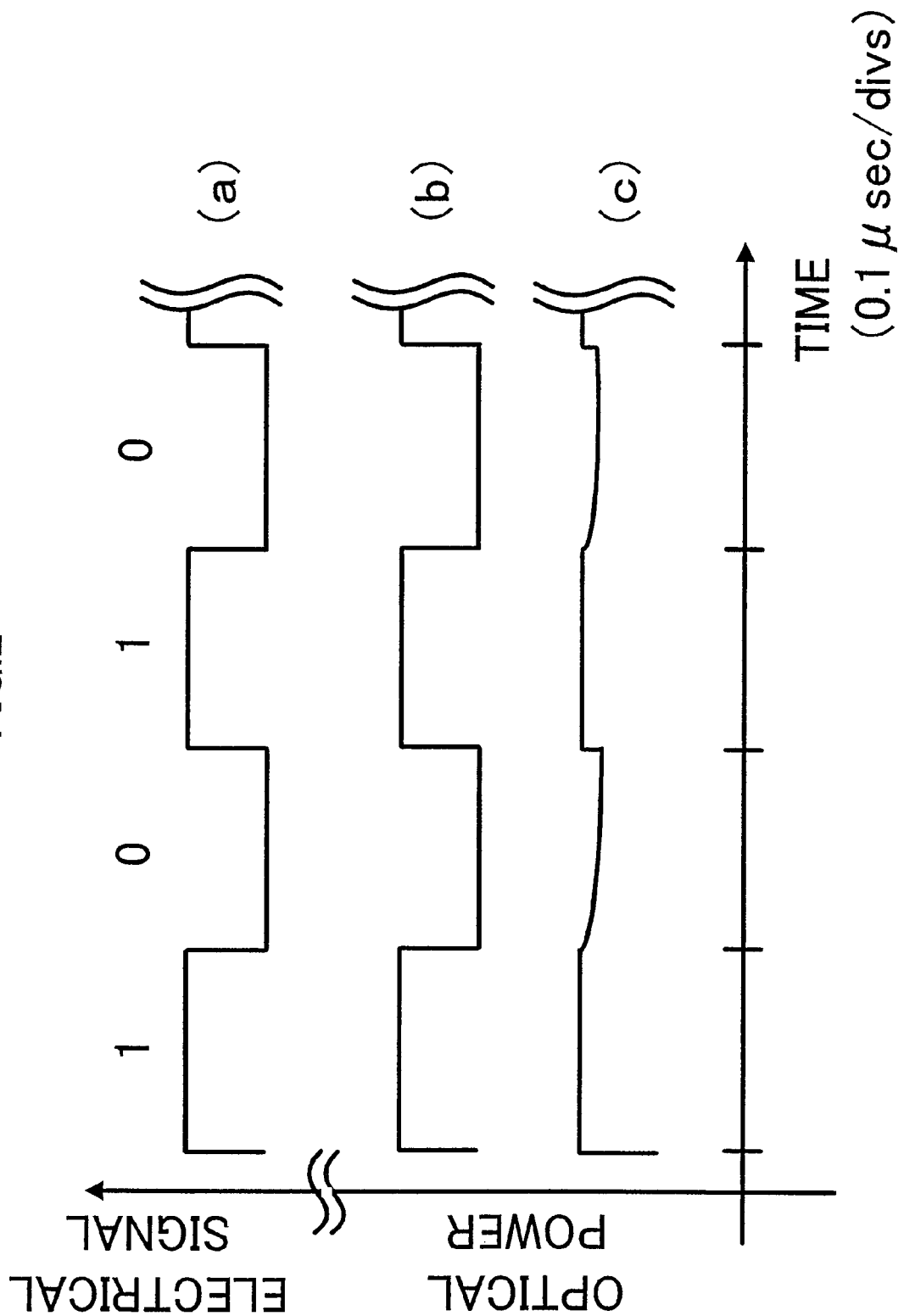
FIG. 2 is a timing chart showing time-dependent changes in a transmission electric signal train (a), in optical signal strength (b) modulated in a modulation circuit for transmission in response to the electric signal train, and in intensity (c) of fluorescence radiated from a fluorescent material, in the illuminator of FIG. 1.

FIG. 1 is a schematic block diagram showing an illuminator including an optical transmission mechanism according to a first embodiment of the present invention, and FIG. 2 is a timing chart schematically showing signals transmitted by the illuminator of FIG. 1. In the drawings of the present application, identical reference numerals denote the same or corresponding parts.

In the illuminator of FIG. 1, an optical illumination system 105 having an optical transmission function and a transmission circuit part 118 are arranged on a ceiling part of a room. An optical illumination part in this optical illumination system 105 having the optical transmission function includes a GaN-based light-emitting diode 100 for emitting light with a wavelength of 390 nm, a lens 101 for diffusing the light emitted from the light-emitting diode 100 and a beam splitter 102 for splitting the light into two parts, so that one split part of the light is applied to an acrylic resin plate 103 in which fluorescent materials of red ($Y_2O_2S:Eu^{3+}$), green (ZnS:Cu, Al) and blue ($(Sr,Ca,Ba,Mg)_{10}(PO_4)_6:Eu^{3+}$) are dispersed. Fluorescent color lights 115 are mixed and radiated into space from the fluorescent materials, whereby white illumination can be achieved.

On the other hand, an optical transmission part in optical illumination system 105 having the optical transmission function emits the other part of the light split by beam splitter 102 into space as signal light 116 through a reflecting mirror 117 and a transparent acrylic resin plate 104. GaN-based light-emitting diode 100 is driven by output of a modulation circuit 106 which receives output derived from a binary digital transmission signal train 108 consisting of 0 and 1 having a transmission rate of 10 Mbps (Mbits/sec.) and also receives output from a bias supply circuit 107 for compensating output fluctuation resulting from the environmental temperature fluctuation and for adjusting luminous energy of the illumination.

FIG. 2 is a timing chart showing a binary digital electric signal train (a), optical output strength (b) of a GaN-based light-emitting diode modulated/driven in response to the electric signal train, and intensity (c) of fluorescence emitted from a fluorescent material. Referring to FIG. 2, the axis of abscissa shows the time with each scale of 0.1 μsec., and the axis of ordinate shows the electric signal level or the optical output strength. As understood from FIG. 2, the GaN-based light-emitting diode is modulated/driven on the basis of the frequency (10 Mbps) of transmission signals, while the decay time of intensity of fluorescence emitted from the fluorescent material is generally about several μsec. and hence a change of fluorescence intensity in 1-bit signal transmission is negligibly small. Further, since this intensity variation of the fluorescence is sufficiently slow with respect to the optical response speed of human eyes, it hardly causes a problem of visually recognizable flickering.

On the other hand, a PC (personal computer) and an information terminal arranged on an arbitrary place of the room are linked with a receiving optical system 111 for optical transmission and a receiving circuit part 114 connected thereto (see FIG. 1). Receiving optical system 111 includes a transparent acrylic resin plate 110 for protection, a condenser lens 101, and a silicon-based photodetector 109. In this receiving optical system 111, light emitted into space from GaN-based light-emitting diode 100 is efficiently introduced into photodetector 109. Then, electric signals photoelectrically converted from optical signals by photodetector 109 are input in a demodulation circuit 112 for producing demodulated transmission signals 113. Demodulation circuit 112 includes a preamplifier circuit for amplifying the received signals, a comparator circuit for discriminating "0" and "1" of the signals from each other, and a waveform shaping circuit for waveform-shaping the signals received from the comparator circuit.

As hereinabove described, it is possible to realize an illuminator including an optical transmission mechanism, which can serve as both a light source for exciting a fluorescent material and a light source for transmission signals. The illumination region of fluorescent light 115 radiated from fluorescent materials 103 irradiated by light-emitting diode 100 is approximately coincides with the region of transmission signal light 116 which has not passed through the fluorescent materials, and thus it is also possible to clarify the transmission region by the illumination region.

The optical structure, the circuit structure, etc. in the first embodiment are not restricted to the aforementioned examples but can have variously modified aspects. While transmission parts 105 and 118 and receiving parts 111 and 114 are provided in one-to-one correspondence in the first embodiment, it is also possible to employ another arrangement such as one-to-N (N: plural integer) correspondence or N-to-N correspondence.

The wavelength of light emitted from light-emitting diode 100 is preferably less than 430 nm, which is the wavelength not present in the sunlight spectra, in order to reduce background light noise resulting from the sunlight and also preferably more than 380 nm in order to prevent epoxy resin used at every portion of the illuminator from being changed in color to yellow by ultraviolet radiation.

Second Embodiment

Figure 3:
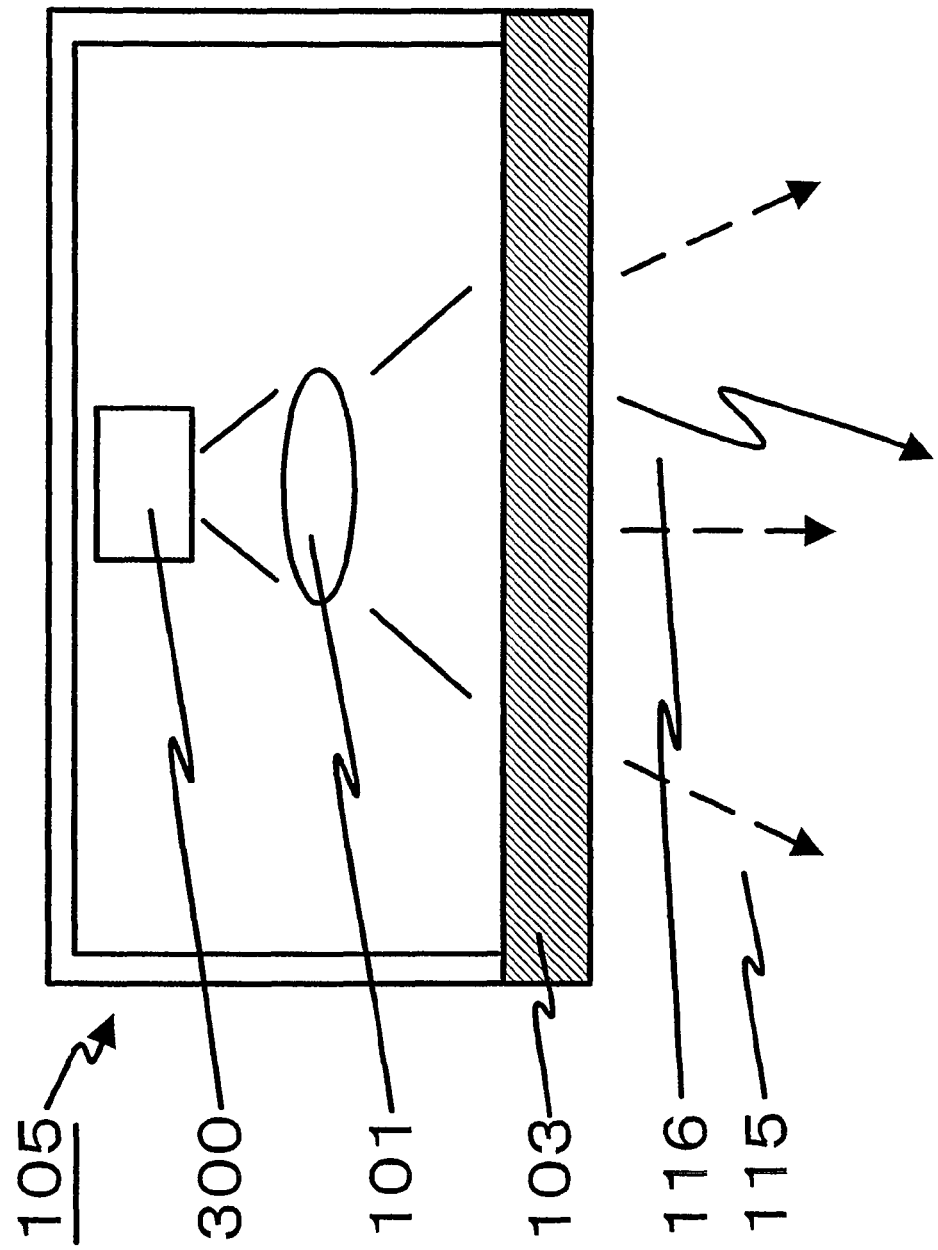
FIG. 3 is a schematic sectional view showing an optical part for optical transmission according to another embodiment of the present invention.

FIG. 3 is a schematic sectional view showing an optical illumination system 105 having an optical transmission function, which is used in a second embodiment of the present invention. In the second embodiment, differently from the first embodiment, a semiconductor laser 300 instead of a light-emitting diode is used as a light source. An acrylic resin plate 103 including dispersed fluorescent materials is set to have such a thickness and/or a dispersion state of the fluorescent materials that fluorescent plate 103 absorbs not all laser light received from the light source 300 but partially transmits/radiates the same into space.

Thus, it is possible to enable high-speed optical transmission by using, as the light source, semiconductor laser 300 which has a smaller time constant determined by the device capacitance as compared with a light-emitting diode and is capable of performing high-speed modulation of at least several GHz. Further, as compared with the first embodiment, it is possible to more simplify the optical system of the second embodiment by using, as signal light 116, light which has not been absorbed by but transmitted through fluorescent plate 103.

In the case of employing a semiconductor laser having spatial coherency as a light source, it is apprehended that a problem of eye safety is caused in relation to laser light emitted into space. However, in the case of irradiating fluorescent plate 103 with laser light and then utilizing, as signal light 106, partial laser light not absorbed by fluorescent materials in plate 103 but radiated into space as in the second embodiment, the partial laser light is scattered by the fluorescent materials and the spatial coherency is reduced, whereby the problem of safety for human eyes can be avoided.

According to the structure of the second embodiment, it is possible to provide an illuminator including an optical transmission mechanism capable of performing transmission at a higher speed as compared with the first embodiment.

Third Embodiment

Figure 4:
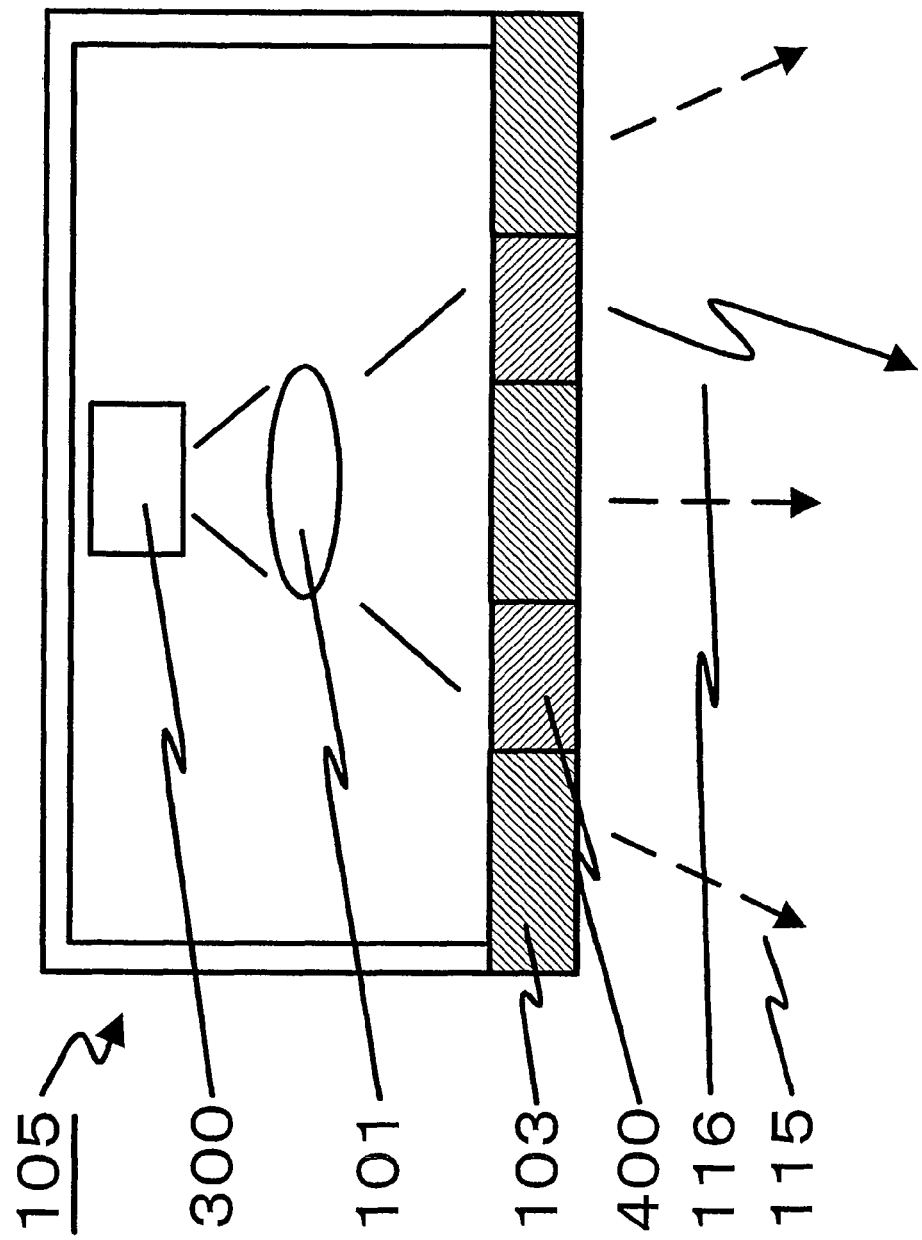
FIG. 4 is a schematic sectional view showing an optical part for optical transmission according to still another embodiment of the present invention.

FIG. 4 is a schematic sectional view showing an optical illumination system 105 having an optical transmission function, which is used in a third embodiment of the present invention. In the third embodiment, differently from the first embodiment, a semiconductor laser 300 instead of a light-emitting diode is used as a light source in optical illumination system 105. An acrylic resin plate includes regions to be irradiated with light emitted from the semiconductor laser, which include a region 103 where fluorescent materials are dispersed and a region 400 where $TiO_2$ particles for scattering light are dispersed.

Also in the third embodiment, the optical system can be simplified. Spatial coherency of laser light emitted from semiconductor laser 300 can be reduced by region 400 where the $TiO_2$ particles are dispersed. Further, according to the third embodiment, it is possible to provide an illuminator including an optical transmission mechanism capable of high-speed transmission. In the case of not requiring extremely high transmission rate, a light-emitting diode can also be used as the light source in place of the semiconductor laser, as a matter of course.

Fourth Embodiment

Figure 5:
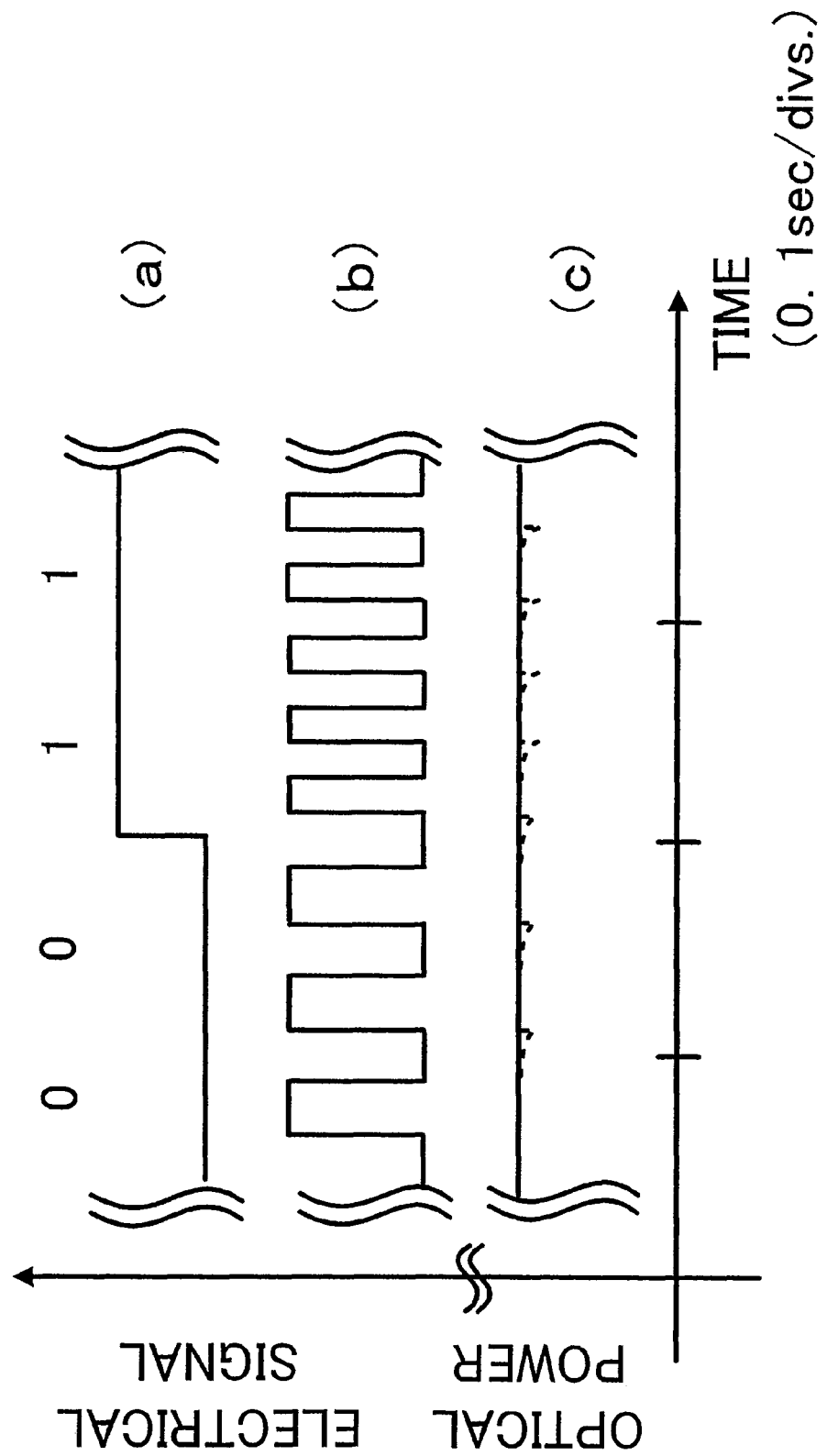
FIG. 5 is a timing chart showing time-dependent changes in a transmission electric signal train (a), in optical signal strength (b) modulated in a modulation circuit for transmission in response to the electric signal train, and in intensity (c) of fluorescence radiated from a fluorescent material, in a further embodiment of the present invention.
Figure 6:
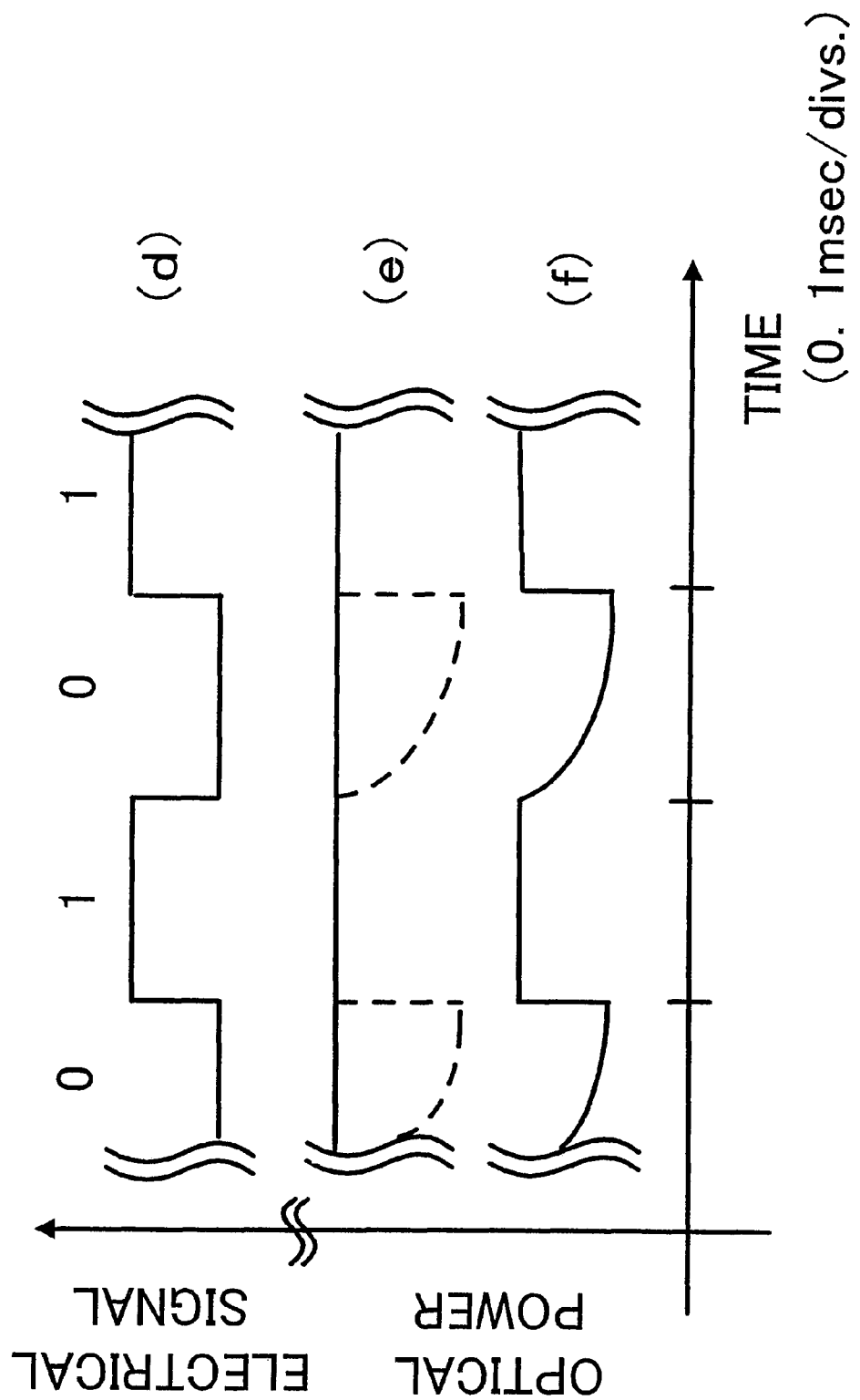
FIG. 6 is a timing chart showing time-dependent changes in a transmission electric signal train (d), in intensity (e) of fluorescence radiated from a fluorescent material, and in light intensity (f) obtained by superposition of signal light and the fluorescence both entering a photodetector, in a further embodiment of the present invention.

With reference to schematic timing charts shown in FIGS. 5 and 6, explanation is now given for a modulation method with a modulation circuit for optical transmission in an illuminator including an optical transmission mechanism according to a fourth embodiment of the present invention. That is, the fourth embodiment provides a more preferable modulation method for optical transmission signals.

In a binary digital transmission signal train consisting of 0 and 1, for example, it is likely that the transmission signals stochastically deviate to 0 or 1 (continuously generated). It is also likely that the transmission rate for the digital transmission signals is extremely low (several 100 bps, for example). In these cases, fluorescence is flickered improperly in the illuminator, due to smaller light modulation rate (Hz) for exciting a fluorescent material as compared to the reciprocal of an decay time (sec) of emission intensity of the fluorescent material.

In order to prevent the binary signals from continuing as many identical signals, it is possible to utilize the so-called encoding process of unitizing the transmission signals by an arbitrary data number and adding a code to every unitized train in response to the arrangement of the signals (i.e., adding 1 or 0 when 0 or 1 is continuing). For a more specific example, it is possible to carry out the process of adding 1 to a train of four transmission signals of . . . 0, 0, 0, 0 . . . thereby converting it to a signal train of . . . 0, 0, 0, 0, 1 . . . .

Even with such a countermeasure, however, it is difficult to completely suppress flickering of fluorescence and further, flickering of fluorescence cannot be prevented when the transmission rate is low. In order to solve these problems, FIG. 5 shows an exemplary transmission signal train according to a transmission method of the fourth embodiment.

In the timing chart of FIG. 5, the axis of abscissa shows the time with each scale of 0.1 μsec., and the axis of ordinate shows the signal power or the optical output. As shown in FIG. 5, a modulated electric signal train (b) exhibiting a constant peak value of driving current pulses for driving a light-emitting device and having pulse frequencies changed so as to have a duty ratio of 50% is employed in correspondence to a transmission electric signal train (a) of 0 and 1 at a transmission rate of 10 bps. The modulation band (Hz) for the modulated signal train (b) is rendered larger than the reciprocal of an decay time (sec.) of emission intensity of a fluorescent material.

The term "decay time of fluorescence" denotes a time required for reducing light intensity to 1/e with reference to initial light intensity. In general, the decay time of fluorescence is about several μsec. and hence the modulation band may be set to at least MHz.

According to the fourth embodiment, it is possible to realize an illuminator including an optical transmission mechanism, in which flickering of the fluorescence intensity can be prevented even in the case that signals of 0 continue in a transmission signal train (see (c) in FIG. 5). While dotted lines of optical output (c) in FIG. 5 show the actual intensity of fluorescence radiated from the fluorescent material, the fluctuation frequency of these dotted lines is sufficiently high as compared with the response speed of human eyes, and thus the fluorescence intensity is felt constant as shown by a solid line of the optical output (c). Further, such a modulation signal train can be effective also in the case of transmission at a medium speed (several 10 kbps). FIG. 6 illustrates an example of such medium-speed transmission.

In the timing chart shown in FIG. 6, the axis of abscissa shows the time with each scale of 0.1 μsec., and the axis of ordinate shows the signal power or the optical output. In this FIG. 6, input of a light-emitting device is modulated directly based on a transmission electric signal train (d) of 0 and 1 at a transmission rate of 10 kbps. In this case, intensity of fluorescence radiated from a fluorescent material is shown by dotted lines of optical output (e) in FIG. 6. However, since the fluctuation frequency of these dotted lines is sufficiently high as compared with the response speed of human eyes, the fluorescence intensity is felt constant as shown by a solid line of the optical output (e).

As such, in the case of a transmission signal train of a medium speed, no human being feels flickering of fluorescence radiated from a fluorescent material even though a light source is modulated directly based on the transmission signal train. However, the actual fluorescence intensity is modulated as shown by dotted lines in the optical output (e). When the signal light modulated by transmission signals and the fluorescence for illumination from the fluorescent material simultaneously enter a photodetector, the incident light exhibits light intensity (f) obtained by superposing influence of tail parts of the fluorescence intensity on the intensity of the signal light, and the tail parts of the fluorescence intensity cause jitters in demodulated transmission signals. Then, the jitters cause reduction of the S/N.

The influence of the jitters can be suppressed, similarly as in FIG. 5 of the fourth embodiment, by setting the modulation band (Hz) for modulating a light source with the transmission signal train (b) to be larger than the reciprocal of the decay time (sec) of emission intensity of the fluorescent material.

While the fourth embodiment has been described with reference to binary digital signals consisting of 0 and 1, it is also applicable to multi-level digital signals or analog signals wherein it is possible to modulate the pulse period in a multi-level or analog manner in response the signals. Further, it is also possible to adopt a method of properly changing the duty ratio of the pulses as desired.

Fifth Embodiment

Figure 7:
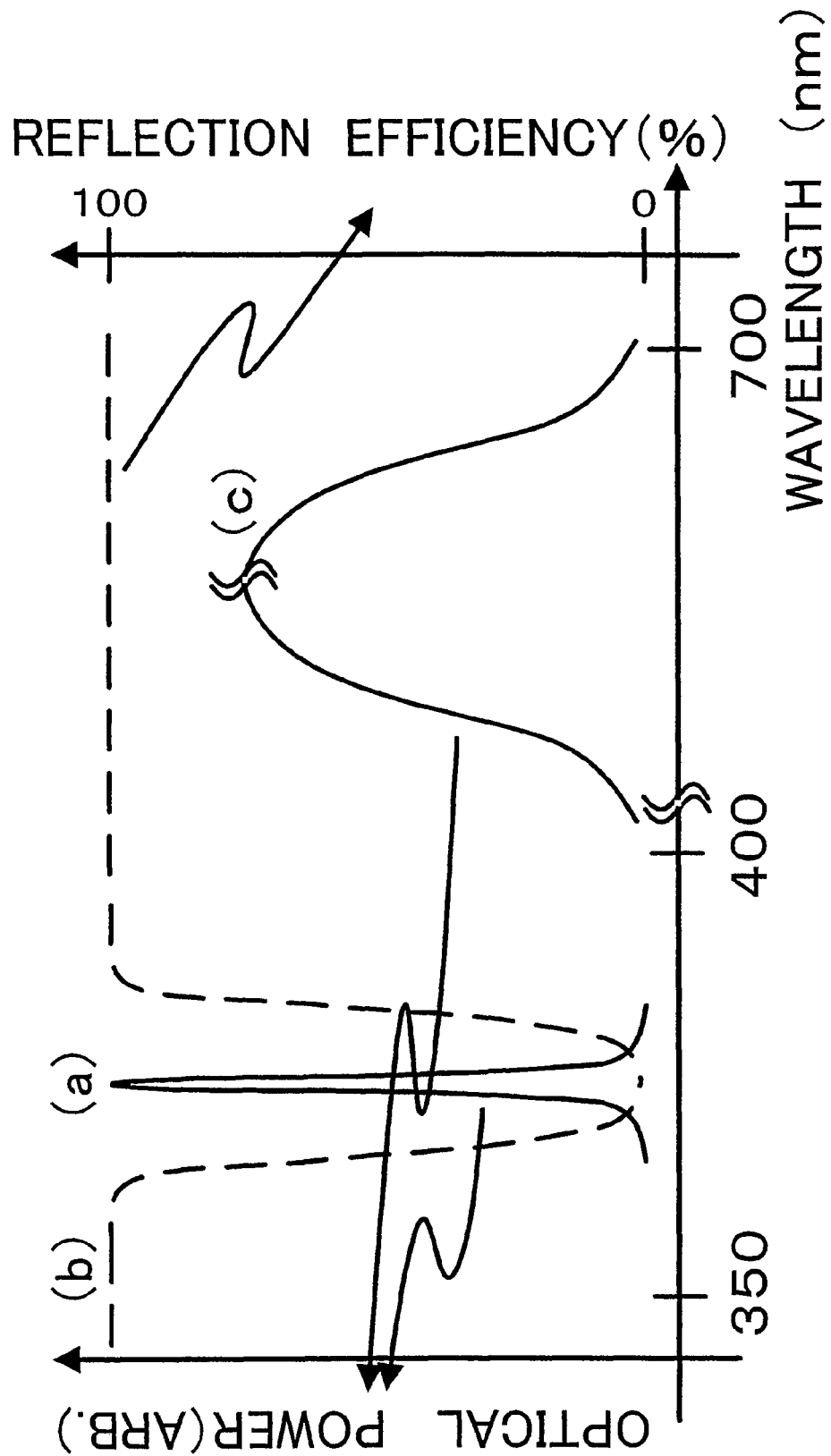
FIG. 7 is a schematic graph showing optical characteristics in a receiving optical system for optical transmission according to a further embodiment of the present invention.

A schematic graph of FIG. 7 illustrates optical characteristics of an illuminator including an optical transmission mechanism according to a fifth embodiment of the present invention. In the illuminator of the fifth embodiment, differently from the first embodiment, an optical film (not shown) having an optical characteristic of transmitting only signal light 116 is provided on a silicon photodetector 109 included in a receiving optical system 111 for optical transmission (see FIG. 1).

Referring to the graph of FIG. 7, the axis of abscissa shows the wavelength (nm) of light, the left axis of ordinate shows the light intensity (arb.: arbitrary unit), and the right axis of ordinate shows the reflectance (%) of the optical film. A curve (a) in FIG. 7 shows the wavelength spectrum of light from a light-emitting device, a curve (b) shows the optical characteristic (reflectance) of the optical film, and a curve (c) shows the spectrum of fluorescence radiated from a fluorescent material. This optical film has the optical characteristic (b) which transmits only the light (a) modulated based on transmission signals and having a central wavelength of 380 nm emitted from a light source while reflecting light of other wavelengths.

In a design technique for the optical film having such an optical characteristic, a multilayer film structure including silicon oxide films and silicon nitride films, for example, can be set utilizing the principle of light interference in the film.

According to the fifth embodiment, the illumination light in the visible light band including red, green, and blue radiated from fluorescent materials and the sunlight acting as background light noise can be prevented from entering the photodetector. Thus, it is possible to improve the S/N which is determined by the power of signal light emitted into space and the power of lights of other wavelengths and then possible to realize an illuminator including an optical transmission mechanism capable of high-speed transmission.

Sixth Embodiment

Figure 8:
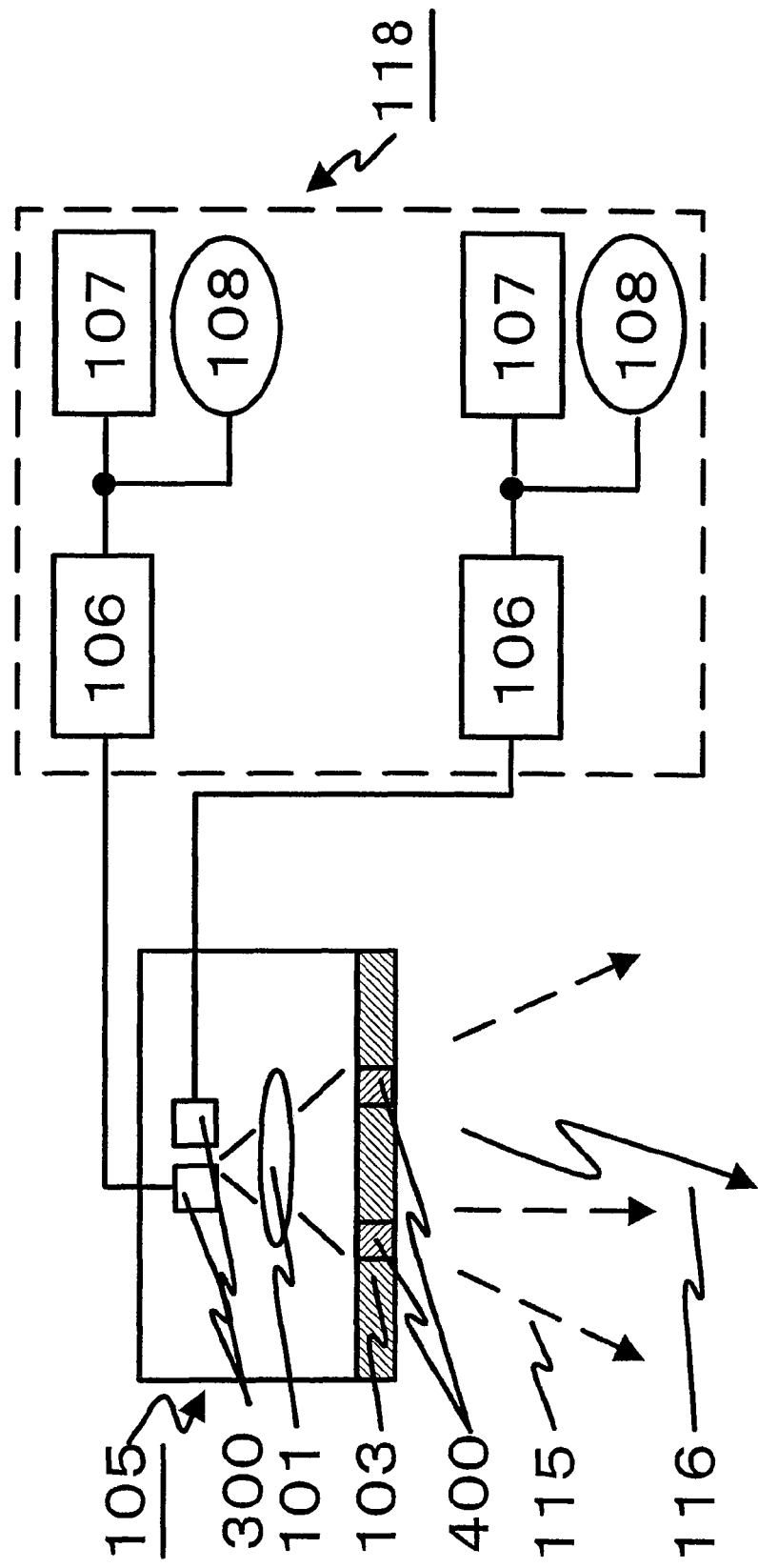
FIG. 8 is a schematic block diagram showing an optical illumination system including an optical transmission mechanism according to a further embodiment of the present invention.
Figure 9:
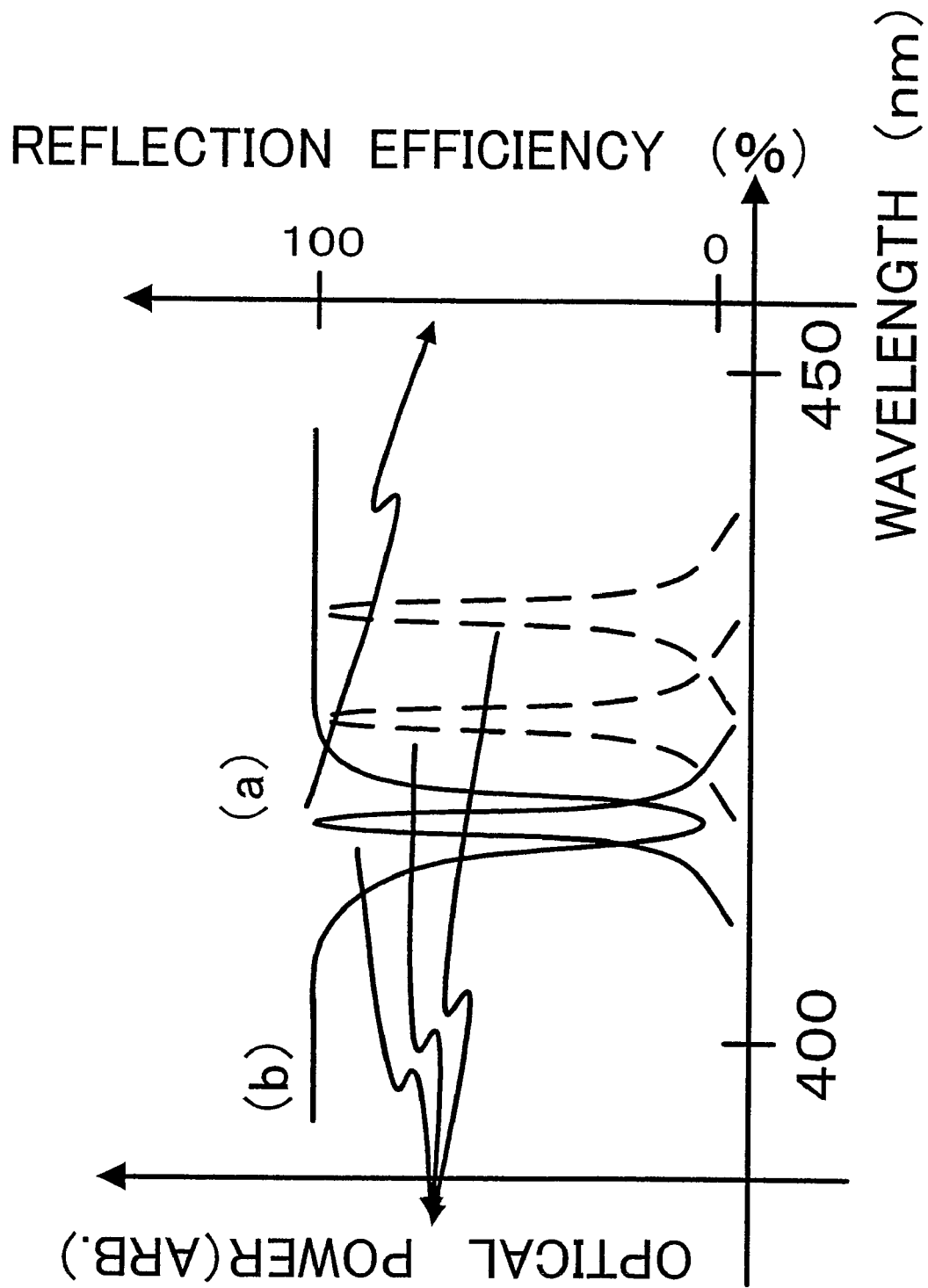
FIG. 9 is a schematic graph showing optical characteristics in a receiving optical system for optical transmission in relation to FIG. 8.
Figure 10:
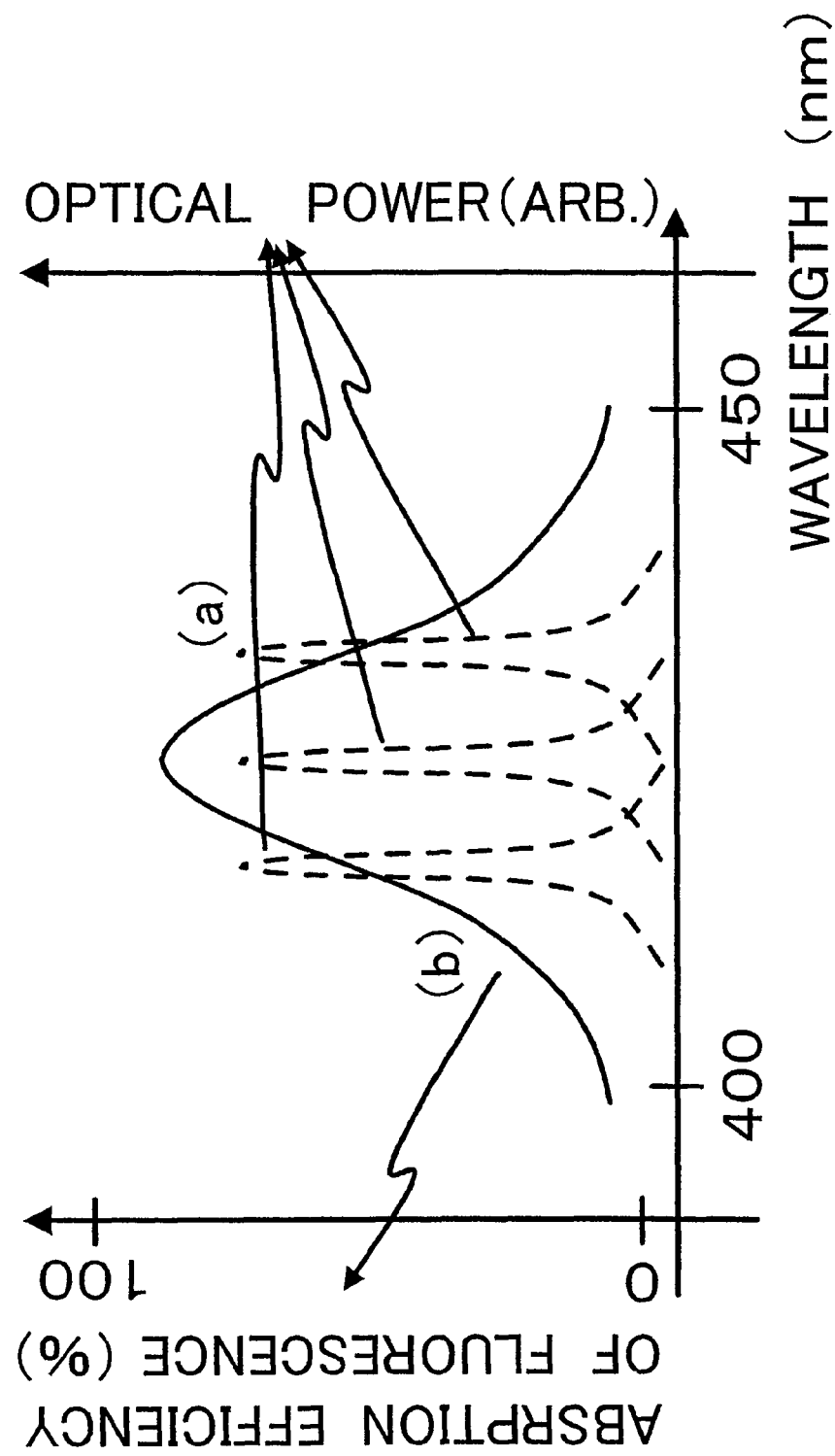
FIG. 10 is a schematic graph showing the relation between an absorption characteristic of a fluorescent material in the optical illumination system shown in FIG. 8 and a wavelength characteristic of source light.

FIG. 8 is a schematic block diagram showing an illuminator including an optical transmission mechanism according to a sixth embodiment of the present invention, and FIGS. 9 and 10 are schematic graphs showing optical characteristics of this illuminator. In the sixth embodiment, differently from the first embodiment, there is provided a light source including three GaN-based semiconductor lasers for lasing at wavelengths of 420 nm, 425 nm, and 430 nm as well as three circuits driving these semiconductor lasers. In FIG. 8, in order simplify the drawing, there is shown only two GaN-based semiconductor lasers 300 and two pairs of circuit parts connected thereto.

In the graph of FIG. 10, the axis of abscissa shows the wavelength (nm) of light, the left axis of ordinate shows the absorption coefficient (%) of a fluorescent material, and the right axis of ordinate shows the light intensity (arb.). Referring to FIG. 10, curves (a) of broken lines show the lasing spectra of the three GaN-based semiconductor lasers 300 including in the light source, and a curve (b) of a solid line shows the absorption spectrum of the fluorescent material. As shown in FIG. 10, the lasing wavelength of each GaN-based semiconductor laser is selected to be included in the absorption band of the employed fluorescent material.

As shown in FIG. 8, each GaN-based semiconductor laser 300 having its own lasing wavelength is individually driven by a transmission signal train 108, a bias supply circuit 107 and a modulation circuit 106 having the same structures as those in the first embodiment. Laser lights emitted from these GaN-based semiconductor lasers 300 are partially applied to a medium 103 in which fluorescent materials are dispersed, so that fluorescence 115 radiated from the fluorescent materials is used for illumination. Light scattered by media 400 including dispersed diffusion material is emitted as signal light 116 into space.

In a receiving optical system for optical transmission according to the sixth embodiment, three photodetectors are provided in correspondence to the three lasing wavelengths. An optical film serving as a band-pass filter for transmitting only one of the three wavelengths 420 nm, 425 nm and 430 nm is provided on the corresponding photodetector, as seen in FIG. 9. In the graph of FIG. 9, the axis of abscissa shows the wavelength (nm) of light, the left axis of ordinate shows the light intensity (arb.), and the right axis of ordinate shows the reflectance (%) of the filter. Referring to FIG. 9, curves (a) show emission spectral distribution of the semiconductor lasers, and a curve (b) shows a reflection characteristic of the optical film in relation to the signal light.

According to the sixth embodiment, it is possible to realize an illuminator including a WDM-type optical transmission system. In this case, since the plurality of semiconductor lasers have not exactly but approximately the same lasing wavelength, i.e., approximately the same energy gap, they can be driven by approximately the same driving voltages. That is, it is not necessary to change the operating voltage for the driving circuits depending on the semiconductor lasers.

Light-emitting devices employable in the illuminator including a WDM-type optical transmission mechanism according to the sixth embodiment are not restricted to the GaN-based semiconductor lasers but GaN-based light-emitting diodes can also be used alternatively. In view of multiplex with a larger number of wavelengths and in view of excellently keeping the S/N by reducing noise light through the optical film, however, it is more preferable to use semiconductor lasers having narrow lasing spectral line widths.

While the GaN-based semiconductor lasers are individually driven based on every transmission signal train in the sixth embodiment, it is also possible to time-divisionally drive every GaN-based light-emitting diode by TMD (time division multiplex)-processing each transmission signal train.

According to the present invention as hereinabove described, since optical transmission and illumination light can be rendered in common by using a single light source, it is possible to simply realize an illuminator having an optical transmission function. According to the present invention, further, it is also possible to provide an illuminator including a WDM-type optical transmission mechanism by using a plurality of light-emitting devices having different wavelengths in a light source.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An illuminator including an optical transmission mechanism, comprising:
   a transmission-side electric circuit for forming electric signals modulated in response to information;
   a light source emitting intensity-modulated light in response to said electric modulated signals;
   optical wavelength conversion means including a fluorescent material for converting part of said intensity-modulated light into illumination light;
   a photodetector for receiving another part of said modulated light and converting the same into reproduced electric modulated signals; and
   a receiving-side electric circuit for reproducing said information from said reproduced electric modulated signals,
   wherein a filter for selectively transmitting said modulated light is provided in front of said photodetector.

2. The illuminator including the optical transmission mechanism according to claim 1, wherein said fluorescent material includes different kinds of fluorescent materials for emitting different color lights.

3. The illuminator including the optical transmission mechanism according to claim 1, further comprising light diffusion means for scattering at least part of said modulated light.

4. The illuminator including the optical transmission mechanism according to claim 1, wherein said modulated light has a wavelength more than 380 nm and less than that of said illumination light.

5. The illuminator including the optical transmission mechanism according to claim 1, wherein said electric signals are encoded to form a train of signal units, each of which corresponds to one of said transmission signals and includes at least one different binary code.

6. The illuminator including the optical transmission mechanism according to claim 1, wherein a modulation rate of said modulated light is smaller than a reciprocal of a decay time of emission intensity of said fluorescent material.

* * * * *